June 3, 1952   H. WARP   2,598,866
MEANS FOR CONTINUOUSLY FORMING THIN PLASTIC SHEETS
Filed Oct. 21, 1946
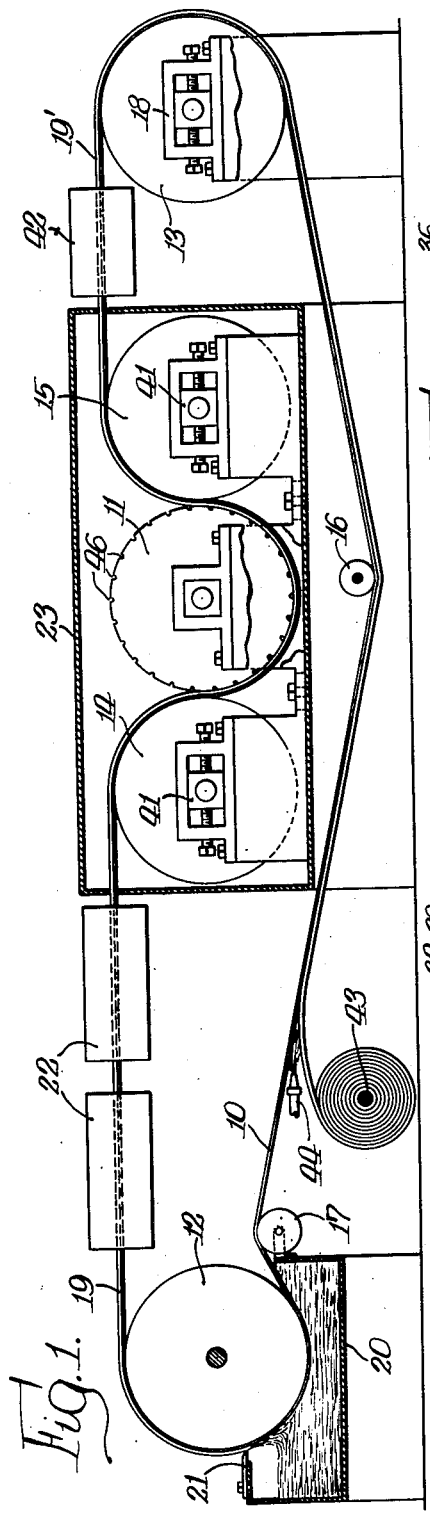
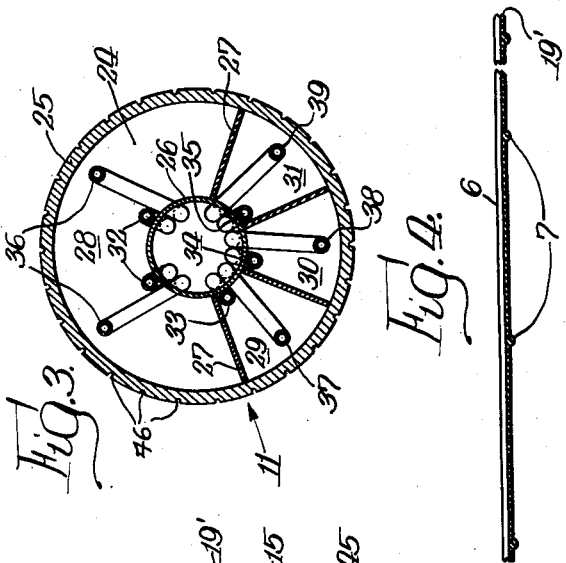
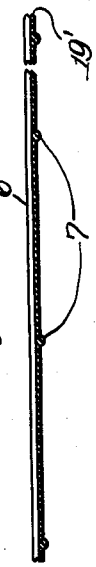
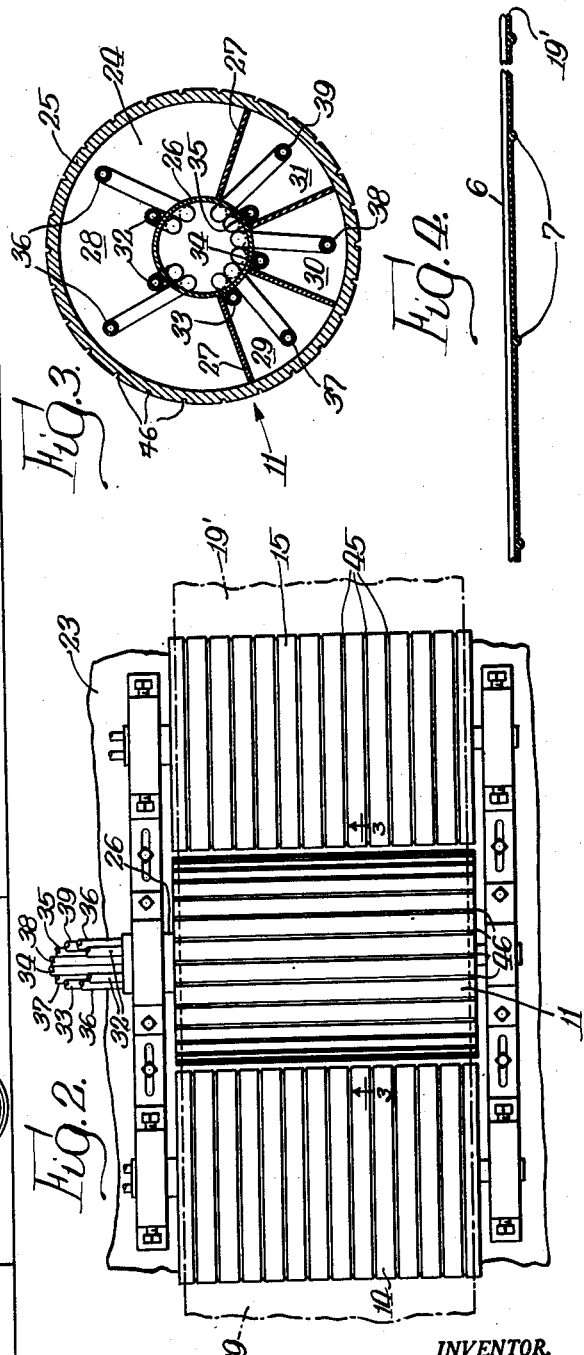
INVENTOR.
Harold Warp,
BY
Clinton, Schrader, Merriam & Hofgren
Attys.

Patented June 3, 1952

2,598,866

UNITED STATES PATENT OFFICE 2,598,866

MEANS FOR CONTINUOUSLY FORMING THIN PLASTIC SHEETS

Harold Warp, Chicago, Ill., assignor to Flex-O-Glass, Inc., a corporation of Illinois Application October 21, 1946, Serial No. 704,648

1 Claim. (Cl. 18—5)

The invention relates generally to means for forming a thin, plate-glass-clear sheet of plastic and, more particularly, a plate-glass-clear and embossed thin sheet of plastic.

There is a present and long unfulfilled demand, despite fevered research, for a thin sheet of one of the plastics which sheet has the smooth surfaces and the clarity of plate glass. Many thin sheets of plastic are now on the market which are highly transparent and which when applied over a package appear very clear and smooth to the layman and the ordinary observer. However, it is recognized by those skilled in the art that these sheets now on the market are not truly transparent. In fact, even the layman can detect this fact by taking such a plastic wrapping from a package of cigarettes or the like and looking through the same at a distant object. When so viewed, the sheet will be observed to have a multitude of minute parallel lines and the light rays passing through the sheet will be diffused as noted by a blurring of the outline of the object.

It is a primary object of the invention, therefore, to provide a means for producing thin sheets of plastic which are truly transparent.

Another object is to provide an apparatus for molding a thin layer of plastic in a moldable state into a thin sheet of plastic with desired areas of both sides of the sheet mirror smooth and operable to retain the molded plastic in the desired form until set, all while the sheet is continuously fed through the apparatus.

It is also frequently desirable that a thin sheet of plastic, i. e., a sheet on the order of .004 of an inch thick, be provided with raised or embossed strips or areas while still remaining transparent and smooth save for the margins of the raised areas. These embossed and thickened portions of the sheet may be solely for the purpose of reinforcing the sheet or they may be solely for ornamental purposes, or they may serve a combined reinforcing and ornamenting function. The production of embossed, thin sheets of plastic on a commercial basis like plain thin sheets has long been sought unsuccessfully.

It is another object of this invention, therefore, to provide means for producing a thin, embossed sheet of plastic in a convenient and facile manner.

Still another object is to provide a means for producing a thin embossed sheet of plastic having surfaces free of minute lines or ripples which reduce transparency.

A further object is to provide an apparatus for forming plain or embossed, thin sheets of plastic having means including an endless belt forming molding means for plastic with the endless belt serving to hold the molded sheet in molded form until it has set.

Other objects and advantages will become apparent from the following detailed description taken in connection with the accompanying drawings, in which:

Fig. 1 is a side elevational view in more or less schematic form of an apparatus embodying the features of this invention. To make any detectable showing of the sheet, it appears many, many times normal thickness and is, of course, greatly out of proportion to the balance of the figure.

Fig. 2 is a top plan view of a portion only of the machine of Fig. 1, the figure being on a larger scale than Fig. 1, and the sheet being shown in broken outline.

Fig. 3 is a transverse sectional view taken along the line 3—3 of Fig. 2 of the main molding wheel.

Fig. 4 is a longitudinal sectional view, very greatly enlarged, of a portion of the finished sheet.

While the invention is susceptible of being practiced by various methods and by altered or modified apparatus, a preferred method and means will hereinafter be described. It is not intended, however, that the invention is to be limited thereby to the specific disclosures made. On the contrary, it is intended to cover all modifications and alternative constructions falling within the spirit and scope of the invention as defined in the appended claims.

Turning first to the method, the plastic of which the sheet is to be made is first dissolved (solution) or suspended (dispersion) in some suitable carrying medium. A layer of this carrying medium having sufficient quantities of the plastic dissolved or suspended therein is then spread upon or laid upon a suitably formed surface. This surface may be perfectly plain if the side of the finished plastic sheet in contact therewith is to be plain, or it may be formed with grooves or other depressed areas if the finished sheet is on that side intended to have a raised configuration, that is, embossing. Whether plain or formed with grooves or depressed areas, the surface is polished to give a mirror smooth surface to the finished sheet. The layer of material, that is, carrying medium and plastic, is then subjected to a controlled atmosphere which reduces the material to a consistency suitable for molding and such reduction of the material may be accomplished in one or in a plurality of steps or stages, as desired. Where the material is a solution, this step or stage involves driving off the excess solvent and, where the material forming the layer is a dispersion, this step involves an absorption of the plasticizer forming the carrying medium into the particles of plastic, a phenomenon known to those skilled in the art. In either event, the layer of material becomes a homogeneous, semi-solid mass capable of flowing, that is, of being molded under pressure. Usually these steps involve a raised temperature, that is, one above ordinary room temperatures, though it is conceivable that the driving off of the solvent or the absorption of the plasticizer might be accomplished in other ways.

When the plastic, now deposited on the formed surface in the form of a relatively thin sheet or film, is in the moldable state above mentioned, a second surface is applied to the opposite or free face or side and sufficient pressure applied to cause the plastic to flow out to the desired thickness determined by spacing of the surfaces and also to flow into any grooves or other depressed areas that may be present so as to assume the configuration desired. This second surface, like the first, may be either plain or formed with grooves or depressed areas but in any event should be polished so as to provide a very smooth surface with which the layer of material is in contact. When thus held between the surfaces which act as molds or dies and which, moreover, are to be distinguished from mere line contact of a pair of squeeze rollers or the like, the material is subjected, if necessary, to a further temperature change of a character which will cause the plastic to set in the configuration which it then has. It will be understood that the nature of the temperature change will vary with the character of the material; an increase in temperature if the material is thermosetting, a decrease if the material is thermoplastic. After the plastic has set and only after it has taken a firm set, the formed sheet is removed from between the surfaces forming the molds or dies and is rolled for further treatment or for shipment. It is to be noted that the method involves the steps of molding the plastic into a thin sheet and holding the plastic under pressure and in its molded form until the plastic has taken a permanent set and no longer has any tendency to resume some earlier or different form.

Means is provided for carrying out the method in a facile and continuous manner. To that end, there is provided an apparatus having a pair of means providing endless moving surfaces which for a portion of their movement are brought and held closely adjacent to one another in a manner permitting molding pressure to be applied thereby to any material interposed therebetween. Such endless moving surfaces might conceivably be provided by a pair of belts or by a belt and a drum or roller of substantial diameter about at least a portion of which the belt curves, or conceivably even by other means. Herein, by way of example, there is disclosed an apparatus embodying the elements of the second mentioned arrangement, namely, an endless belt 10 and a drum or roller 11 of large diameter about a portion of which the belt is caused to curve. As a matter of fact, the apparatus employs four large drums or rollers 12, 13, 14 and 15 in addition to the drum 11. Of these, drums 12 and 13 determine the extreme limits of the path of the belt 10, being located respectively at the front and rear of the apparatus. Drums 14 and 15 are, for purposes hereinafter more fully described, positioned on opposite sides of the drum 11. As clearly seen in Fig. 1, the belt 10 runs over the end drums 12 and 13 and partially around the drums 14, 11 and 15 in an interlaced manner, that is, over the drum 14, under the drum 11, and again over the drum 15. Naturally supplementing the large drums 11 to 15, inclusive, are at least a pair of small rollers 16 and 17 which serve primarily to guide the endless belt 10. One of these, namely, roller 16, is disposed beneath the drum 11 while the roller 17 is disposed just in advance of the drum 12, considered in the direction of movement of the belt. Note that all of the drums and rollers save the roller 17 (drum 11 is maintained out of contact with the belt 10 by the layer of material) contact the interior surface only of the belt. Roller 17, therefore, should be made of a material that will not mar the polished external surface of belt 10. To obtain the necessary pressure between the endless belt 10 and the drum 11, the belt must, of course, be held taut. The degree of tautness may be varied either by adjusting the roller 16 toward or from the drum 11 or by adjusting the drum 13 longitudinally of the apparatus, made possible by adjustable bearings 18 in which the drum 13 is journaled.

Means is provided for laying on the belt 10 at the drum 12 a thin layer 19 of the material which is to be molded into the thin sheet. This layer of material may be applied either as a solution employing a solvent as the carrying medium for the plastic particles or as a dispersion with a plasticizer constituting the carrying medium for the plastic particles. The means for applying the layer is not critical to this invention and the layer of material may be fed onto the belt as by a hopper or the drum 12 may cause the belt 10 to dip into a bath of the material and thus pick up a sufficient layer of the material to form the thin sheet. Herein a bath 20 of material is illustrated with the drum 12 so disposed as to have its periphery below the level of the material in the bath so that the belt will pass through the material. To that end, the roller 17 is mounted on the leading edge of the bath, considered in the direction of movement of the belt 10, so as to lift the belt over the edge of the bath while the trailing edge of the bath 20 is provided with a doctor blade 21 mounted for adjustment toward and from the drum 12 so as to determine the thickness of the layer of material that is applied to the belt.

Interposed between the drum 12 with its bath 20 and the drums 11, 14 and 15 are a plurality of, herein two, controlled atmosphere chambers 22. These are here diagrammatically shown and are intended to represent slightly different steps or stages in the method, and individually controlled chambers of the apparatus. Where the carrying medium is a solvent, extraction of the carrying medium is, of course, a vaporizing process and is preferably conducted in two stages with the majority of the solvent driven off by the application of higher temperatures to the material and large volumes of air flow across the material as it passes through the first of the two chambers where provision is made for recovery of the large amounts of solvent that will be driven off. It will be appreciated that the solvent should not be driven off at such a rate as to cause a boiling thereof for bubbles might then be trapped in the sheet. While passing through the second of the two chambers 22, additional solvent may be driven off and the temperature of the material further raised converting the material to a semi-solid but still flowable and moldable state. Where the layer 19 of material is a dispersion, the reduction of the material to a semi-solid state is a combined process of absorption of the plasticizer into the particles of the plastic and a fusing or blending of the particles into a homogeneous mass. Thus as the layer of material passes through the first of the two controlled atmosphere chambers 22, the temperature of the material is raised to bring about the absorption of the plasticizer into the particles of the plastic, as well known to those skilled in the art, and to initiate fusion of the particles while the temperature of the second of the chambers 22 serves to complete the fusing or blending process.

The drums 11, 14 and 15 are mounted in a third controlled atmosphere chamber 23 and, in addition, one or more of the drums 11, 14 and 15 may be individually controlled as to the temperature of various parts thereof. Typical of the construction which the drums 11, 14 and 15 may have is that shown for the drum 11 in Fig. 3. The drum 11, of course, has end walls 24 and a peripheral wall 25. Extending axially of the drum is a cylinder 26 having spider-like partitions 27 extending radially therefrom into substantially fluid-tight engagement with the inner surface of the peripheral wall 25. In this way, the cylinder 26 with its spider-like partitions 27 divides the drum into a plurality of compartments 28, 29, 30 and 31, for example. Extending longitudinally of the drum just outside of the cylinder 26 are a plurality of pipes 32, 33, 34 and 35 adapted to communicate through small openings formed therein throughout the length thereof with the chambers 28, 29, 30 and 31, respectively. Similarly extending longitudinally of the drum but near the periphery rather than near the center thereof are pipes 36, 37, 38 and 39, again located, respectively, in the chambers 28, 29, 30 and 31 and having small radial openings throughout the length thereof. The pipes 32 to 39, inclusive, are all adapted at one end to extend radially into the cylinder and thence outwardly of the drum 11 through one end thereof within the journal in order that they may remain stationary while the drum rotates relative thereto. These pipes are then connected to sources of fluid maintained at different temperatures with the fluid preferably being supplied to the chambers through the pipes 32 to 35, inclusive, and withdrawn from the chambers through the pipes 36 to 39, inclusive. In the particular embodiment here shown and with a thermoplastic material, the chamber 28 is heated while the chambers 29, 30 and 31 are maintained at successively lower temperatures in order to cause the material to take a set before it leaves the space between the belt 10 and the drum 11.

As above indicated, the drums 14 and 15 are preferably controlled as to temperature though it is usually not necessary that there be variation in the temperature of different parts of the drum. The drums may, therefore, be controlled as to temperature by means similar to that disclosed for the drum 11 but without the partitions dividing the drum into separate chambers. The temperatures at which the drums 14 and 15 will be maintained will vary with the nature of the plastic, that is, thermosetting or thermoplastic, and thus may be either higher or lower than the temperature of that portion of the drum 11 immediately adjacent the drums 14 and 15. In this connection, one precaution must be exercised, particularly when a thermoplastic material is being molded, and that is that the drum 11 at the point where the sheet 19' is to peel off the drum is at a temperature lower than the belt 10 at that point in order that the plastic sheet will, in well known manner, adhere to the surface of higher temperature, herein the belt, and peel off the drum 11. This is for several reasons not difficult of attainment even should the drum 15 be at a materially lower temperature than drum 11. The belt 10 after all does not contact drum 15 until the critical point is reached, the layer of plastic retards the transmission of temperature change from drum 11 to belt 10, and constant movement of the belt causes a further lag in temperature change of the belt relative to the drum 11.

Inasmuch as it is of the essence of this invention first to mold the sheet to its desired form and then to retain the sheet in its molded form until it has taken a permanent set while at the same time obtaining a continuous production of the sheet, the drum 11, at least, is of large diameter so as to provide a large surface, measured lengthwise of the belt, with which the belt may be associated for the necessary period of time to carry out the above named essential steps of the invention. To further that end, the drums 14 and 15 should be so located that in passing over them and under the drum 11 the belt will contact a goodly portion of the periphery of the drum 11. Herein the drums 11, 14 and 15 are so located that their axes lie in a common plane with the belt 10 thus contacting 180° of the periphery of the drum 11. It is conceivable, however, that the drums 14 and 15 might be located higher or lower than shown in Fig. 1 so as to cause the belt to contact more or less than the half of the circumference of the drum 11 now contacted. To determine and vary the thickness of the sheet that will be obtained, the drums 14 and 15 should be adjustable relative to the drum 11 so as to vary the clearance between the belt 10 and the drum 11 as it passes thereover. To that end the drums 14 and 15 are journaled in bearings 41 which are adjustable to vary the spacing between the drums 14 and 15 and the drum 11 where they are tangent to one another.

Interposed between the controlled atmosphere chamber 23 and the drum 13 is a fourth controlled atmosphere chamber 42 through which the belt 10 and the now formed sheet 19' pass. The atmosphere in this chamber will be such as to cause a completion of the setting of the material and a reduction of the material to its final and permanent form. This may involve further cooling of the sheet 19' or it may involve a raising of the temperature of the sheet to effect a curing operation, or it may be a combination of or a compromise of those extremes.

Because of the extreme thinness of the finished sheet 19', it must be carefully handled and particularly the removal of the sheet from the belt must be carefully done. Herein the finished sheet is wound on a roll 43 which is herein shown located near the front end of the machine. To aid in peeling the sheet off the belt, there are positioned underneath the belt and at a point somewhat beyond where the finished sheet is peeled from the belt a plurality of air nozzles 44 from which jets of air are directed obliquely against the belt 10.

The means providing the cooperating surfaces acting as dies, herein the drum 11 and the belt 10, must, of course, be constructed of such material as is capable of taking and retaining a polished surface and also of taking and retaining grooves, recesses, or the like to produce a sheet which is embossed on one or both sides. The drums 11, 14 and 15 must also be capable of transmitting heat and cold readily and thus the drums 11, 14 and 15 are likely to be constructed of some suitable metal. It is also likely that the belt 10 will be constructed of a metal strip thin enough to bend readily around the various drums. It is, however, not necessary that the belt 10 be constructed of a solid strip of metal. On the contrary it might be constructed of a strip of material other than metal, such as paper or cloth, both preferably reinforced, or of a wire mesh material so as to gain greater flexibility. When the belt is constructed of reinforced paper, cloth, or similar materials, a smooth polished surface is obtained by coating the belt with a suitable composition such, for example, as urea formaldehyde. When a mesh material belt is employed, the meshes would first be filled with some compound which either would take a smooth polished surface or which would then be coated with some material the same as the cloth or paper belts.

Inasmuch as it is an important objective of this invention to provide a method and a means for producing not only a thin sheet which is truly transparent but such a thin sheet which is embossed on one or both sides, the belt 10 and the drum 11 are herein shown as adapted for such formation of embossed sheets. By way of example, but not of limitation, the apparatus is here shown as designed to produce the reinforced plastic sheet disclosed in the Warp application Serial No. 632,538, filed December 3, 1945, now patent No. 2,545,981 of which this application is a continuation in part. In that sheet, simple reinforcing ribs 6 and 7 are provided on opposite sides of the sheet with the ribs on one side of the sheet, herein the ribs 6, extending longitudinally of the sheet, and the ribs 7 on the opposite side of the sheet extending transversely of the sheet. Accordingly, the belt 10 is, on what may be termed its outer surface, formed with a plurality of parallel grooves 45 (see Fig. 2) extending longitudinally of the belt. Formed on the cylindrical face of the drum 11 (see Figs. 2 and 3) are a plurality of parallel and transversely extending grooves 46. It will be appreciated that the grooves 45 and 46 form a very simple configuration but that there is no necessity for confining the configuration given to the sheet to such simple reinforcing beads but any configuration desired may be formed on the sheet including lace patterns, flowers, animals, or any configuration that might be desired to adapt the sheets for various purposes such as window curtains, shower curtains, wall coverings, etc.

While it is believed that the manner in which the apparatus functions to carry out the steps of the method will be readily understood from the foregoing, a description and a brief resume of the operation will be given. The belt 10 is, of course, driven continuously and at a uniform rate and, moreover, the drive for the belt 10 and the drive for the drum 11 are positive, synchronized drives so that there will be absolute uniformity in the linear speed of the belt and of the outer periphery of the drum 11 so that there will be neither any differential in the rate of movement of the two surfaces while they are simultaneously in contact with the sheet, nor will there be any accidental slippage of one surface relative to the other. The belt 10, moreover, will be driven at such rate as will be determined by the characteristics of the plastic employed, by the carrying medium for the plastic, and other factors, for it is, of course, essential that the layer of plastic on the belt reach the point of contact of the belt on the drum 11 at a time before the plastic has taken any set and while it is still in a moldable and flowable state. Further, the length of time that the belt is in contact with the drum 11 must be such that the plastic can take a permanent set. Thus the speed at which the belt is driven will also be controlled by the diameter of the drum 11 and the extent to which the belt extends around the periphery of the drum. The length of the various controlled atmosphere chambers 22 and 42 will vary with the speed of the belt.

Assuming that all of these various factors have been properly coordinated and that the drums 14 and 15 have been adjusted relative to the drum 11 to provide the desired clearance between the belt and the drum 11, and that the drum 13 has been adjusted to produce the proper tension on the belt, the apparatus may be placed in operation. As the belt 10 dips into the bath 20, it will pick up a layer of plastic compound reduced to the proper consistency by the employment of a solvent or by some other carrying medium, if the dispersion method of liquefying the plastic is employed. As the belt with the layer of compound passes the doctor blade 21, the layer 19 is reduced to a uniform and desired thickness which will be greater than that of the finished sheet. The extent to which the layer 19 of material exceeds the thickness of the finished sheet will vary depending on whether the finished sheet is to be perfectly plain on both sides or is to be embossed on one or both sides, and also on the manner of rendering the plastic to a fluid state, that is, solution or dispersion. Obviously, where the sheet is to be embossed on both sides, a greater thickness in the layer of unmolded plastic will be required than if the sheet were plain, in order to provide the material going into the raised or embossed areas of the sheet. Similarly, if the plastic is carried by a solvent, the thickness of the layer will have to be greater than if it is in the nature of a dispersion, for evaporation of the solvent will, of course, materially reduce the volume, whereas in a dispersion the change in volume may be negligible or even result in a slight increase as the dispersion is converted into a solid mass. However, even with the material provided in the form of a dispersion and with a perfectly plain sheet to be formed, it is preferable to have a very slightly thicker layer than the thickness of the finished sheet in order to assure absolute uniformity of the sheet. The belt with its layer 19 of liquid material next passes through the controlled atmosphere chambers 22 where the conditions are such that the layer of material 19 is reduced to a semi-solid but still flowable and moldable state as previously described.

The material remains in this state until it reaches the point of contact between the belt 10 and the drum 11 where it is by the pressure of the drum 14 acting on the belt 10 and the drum 11 molded into a sheet of the desired thickness and, if the sheet is to be embossed, into the desired configuration. Where the sheet is to be embossed, the thickness of the layer 19 will be sufficiently greater than the thickness of the finished sheet so that there will be excess material which will be forced into the grooves, recesses or depressions formed in the faces of the belt and the drum 11. Having been molded into the desired shape, the sheet is not released as has been the past practice, but it is, on the contrary, held between the belt and the drum 11 for a considerable period of time and is, moreover, held in the same configuration initially given it. While it is thus held between the belt and the drum 11, it is as it passes around the drum subjected to different temperatures, herein progressively lower temperatures. These temperatures are such that the sheet is permanently set before it reaches the point where the belt curves away from the drum 11 and runs over the drum 15. Because the drum 11, particularly at the chamber 31, is at a low temperature, specifically at least lower than the temperature of the drum 15, the surface of the drum 11 at that point will be at a temperature lower than that of the belt 10 and thus, as is characteristic of plastics, the sheet will adhere to the belt and readily peel off the drum 11 and be carried by the belt through the chamber 42 around the drum 13 and forwardly toward the front of the machine. Upon reaching the roller 43, the finished sheet 19' is wound onto the roller 43. To aid in peeling the sheet from the belt without tearing, jets of air from the nozzles 44 are directed against the belt at the line of severance of the sheet from the belt.

It is believed apparent from the foregoing that I have perfected a method and apparatus for forming truly transparent sheets of plastic in a continuous operation. The sheets are free from ripples or lines which tend to interfere with the true transparency even though those lines or ripples are not generally realized as present in present day, thin plastic sheets except by those working in the art and by the layman after he has been apprised thereof and the interference with the transparency pointed out to him. With my method and apparatus, moreover, the sheets may be either plain or embossed on one or both sides, as desired, and with the embossing taking any degree of intricacy desired from simple reinforcing ribs to very intricate lace or flower patterns. The thickness of the sheet is readily varied and the sheet produced can be made endless and thus can be wound into rolls of any desired length and is in nowise limited to sheets of some specific and relatively small size, such as might be produced by a pair of flat platens.

In the specification and claim, the term "plastic" is employed and intended as a noun designating a general type of material, more particularly, a synthetic polymer or copolymer and is not employed as an adjective indicating a certain state of a material.

Similarly, the term "polished surface" is intended to mean generally a very smooth surface which normally is obtained by rubbing or polishing, but it is not necessarily limited to attainment by those methods but is intended to cover an equally smooth surface which is attained simply by flowing a material over a surface if there is any such material which is capable of flowing and setting with such a finish.

I claim as my invention:

An apparatus for continuously forming a thin, transparent, polished-surface sheet of plastic comprising, in combination, a first means providing a movable, endless surface, a second means providing a second movable, endless surface, said surfaces moving at the same linear rate in paths which over a significant portion thereof are closely adjacent and consistently uniformly spaced to form moving and cooperating dies for molding plastic received therebetween and for confining the plastic under pressure for a predetermined time in the shape into which it has been molded until set, means for applying a layer of plastic in a fluid state to one of said surfaces, a controlled atmosphere chamber through which said surface having the layer of plastic passes disposed between the point of application of a layer of plastic and the approach of said surfaces into close proximity to one another and acting on the layer of plastic to convert the layer to a moldable layer of plastic, and means for altering the temperature of the plastic while confined between said surfaces and between the time the plastic enters and leaves the space between said surfaces to cause a setting of said plastic.

HAROLD WARP.

REFERENCES CITED

The following references are of record in the file of this patent:

UNITED STATES PATENTS

| Number | Name | Date |
| --- | --- | --- |
| 1,391,805 | Subers | Sept. 27, 1921 |
| 1,876,432 | Phillips | Sept. 6, 1932 |
| 1,880,110 | Shapiro | Sept. 27, 1932 |
| 1,949,175 | Netzel | Feb. 27, 1934 |
| 2,030,066 | Jenett | Feb. 11, 1936 |
| 2,069,589 | Meigling et al. | Feb. 2, 1937 |
| 2,161,454 | Calvert | June 6, 1939 |
| 2,218,227 | Winnek | Oct. 15, 1940 |
| 2,280,136 | Webster et al. | Apr. 21, 1942 |
| 2,303,554 | Humphreys | Dec. 1, 1942 |
| 2,403,644 | Emmer | July 9, 1946 |
| 2,075,735 | Loomis | Mar. 30, 1937 |
| 2,442,443 | Swallow | June 1, 1948 |